F. G. CANFIELD.
CONNECTOR FOR SIDE CHAINS OF TIRE ARMORS.
APPLICATION FILED NOV. 2, 1916.
1,245,678.
Patented Nov. 6, 1917.
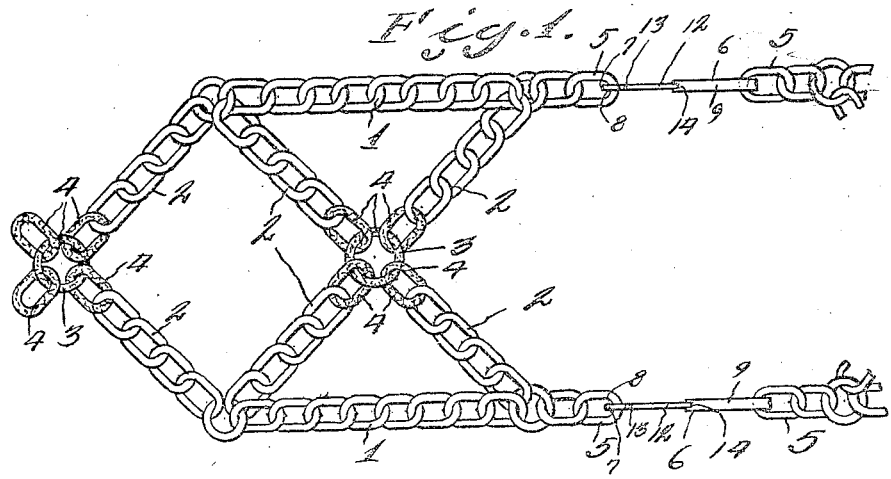
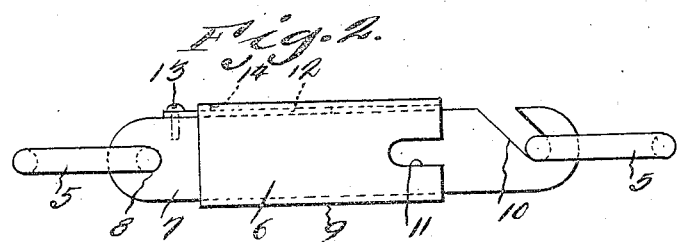
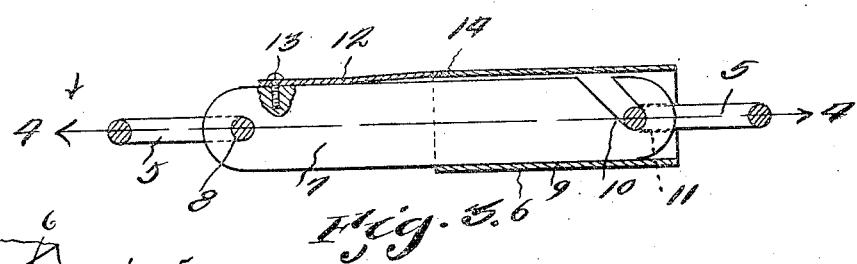
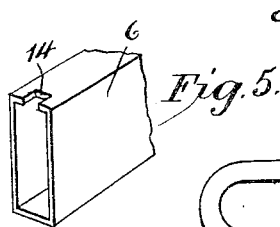
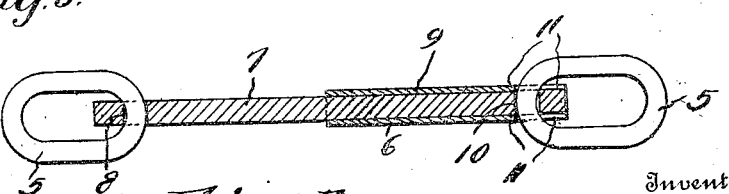
Inventor
F. G. Canfield

UNITED STATES PATENT OFFICE.

FRANKLIN G. CANFIELD, OF OWENSBORO, KENTUCKY.

CONNECTOR FOR SIDE CHAINS OF TIRE-ARMORS.

1,245,678.

Specification of Letters Patent.

Patented Nov. 6, 1917.

Application filed November 2, 1916. Serial No. 129,134.

*To all whom it may concern:*

Be it known that I, FRANKLIN G. CANFIELD, a citizen of the United States, residing at Owensboro, in the county of Daviess, State of Kentucky, have invented a new and useful Connector for Side Chains of Tire-Armors; and I do hereby declare the following to be a full, clear, and exact description of the invention, such as will enable others skilled in the art to which it appertains to make and use the same.

This invention relates to a connector for the side chains of a non-skidding armor to hold the armor in place.

A feature of the invention is to provide an improved connector or coupling between the split ends of the side chains, said connector consisting of a plate link and a rectangular tubular link or slide, to receive the plate link, which is provided with an angular slot to receive the end link of one of the ends of one of the chains.

Another feature of the invention is to provide a rectangular tubular slide or sleeve with slotted side walls, the slots of which engage the arch of the end link that engages the inclined slot, there being a leaf spring secured on the plate link to hold the sleeve or slide in such engagement.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view of a section of a tire-chain armor constructed in accordance with the invention.

Fig. 2 is a view in side elevation of the connector or coupler of one of the side chains.

Fig. 3 is a sectional view through the connector or coupler and two of the links 5 and showing the plate link 7 in elevation.

Fig. 4 is a sectional view on line 4—4 of Fig. 3 and illustrating the two links 5 in elevation.

Fig. 5 is a detail view of one end of the sleeve slide showing the notch 14.

Referring more especially to the drawings, 1 designates the side chains of the armor, which are split as shown, and 2 denotes connecting chains between the side chains. These chains 2 extend substantially at 45 degree angles to the side chains, and the inner ends of the chains 2 are connected by a ring 3. Therefore, the chains 2 are arranged at right angles to each other, that is in pairs. The rings 3 and the links that are connected thereto are roughened or otherwise jagged as shown at 4, so as to more firmly bite into the road bed or snow, sleet or ice. The end links 5 of each side chain are joined by a connector or coupler 6, which comprises the plate link 7 (which is pivoted permanently at 8 on one of the links 5) and the rectangular tubular slide or sleeve 9, which is of a width a trifle larger than the width of the plate link, and designed to receive said plate link. The plate link 7 at one end is provided with a slot 10 inclined toward the pivoted end 8 of said link, substantially on a 45 degree angle, and is designed to receive the arch portion of the other link 5, thereby connecting the two end links 5 of one of the side chains. When one of the links 5 is in engagement with the slot 10, the sleeve 9 is moved in the direction to envelop or overlie the slot, so that the slots 11 in the opposite side walls of the sleeve will engage or receive the arch portion of the link 5, thereby preventing the link 5 from disengaging the slot 10. A leaf spring 12 is secured to one edge of the plate link 7 by means of a screw 13. When the sleeve 9 is out of engagement with one of the links 5, the spring 12 may be depressed, so as to enter the sleeve, as shown in dotted lines in Fig. 2. However, when the sleeve is moved, so that the slots 11 will engage the arch of one of the links 5, the free end of the leaf spring will engage a notch 14 at one end of the sleeve or slide 9, and thereby hold the slots or notches 11 in engagement with one of the links 5, thereby preventing the same from disengaging the slot 10. By this form of connector the chain armor is held upon the tire. By sliding the sleeve or slide over the spring 12, the same having previously been depressed, the link 5 may be disengaged from the slot 10.

The invention having been set forth what is claimed as new and useful is:—

A connector for the adjacent ends of a chain, comprising a link plate pivoted to one of said ends and having its opposite end provided with a notch extending from the center of said opposite end at a 45 degree angle toward the pivoted end of the plate and opening at the edge of the plate and adapted to engage the arch of a link at the other end of said chain, a substantially flat sleeve slide rectangular in cross section corresponding to the shape of the plate and slidably fitting the same, the side walls of the slide at one end thereof having opposite notches to engage the arch of the link which engages the first notch, thereby holding the link connected to the plate, the edge wall of the slide at the other end thereof having a recess, and a leaf spring holding device having one end secured to one end of the plate and its free end adapted to engage said recess, to hold said slide in position whereby its opposite notches may be retained in engagement with the arch of said link, the free end portion of said spring when depressed from said recess also adapted to extend into the sleeve slide when it is moved.

In testimony whereof I have signed my name to this specification in the presence of two subscribing witnesses.

FRANKLIN G. CANFIELD.

Witnesses:
J. T. DIXON,
FRANK C. MALEN.